(12) United States Patent
Marquis et al.

(10) Patent No.: US 7,135,106 B2
(45) Date of Patent: Nov. 14, 2006

(54) PORTABLE WATER PURIFIER

(75) Inventors: Gilles Marquis, La Malbaie (CA); Maxime Beaulieu, La Malbaie (CA)

(73) Assignee: Aquagenex Inc., Quebec (CA)

( * ) Notice: Subject to any disclaimer, the term of this patent is extended or adjusted under 35 U.S.C. 154(b) by 152 days.

(21) Appl. No.: 10/820,175

(22) Filed: Apr. 8, 2004

(65) Prior Publication Data

US 2004/0256302 A1    Dec. 23, 2004

Related U.S. Application Data

(60) Provisional application No. 60/460,950, filed on Apr. 8, 2003.

(51) Int. Cl.
*C02F 1/78* (2006.01)

(52) U.S. Cl. ............... 210/97; 210/192; 210/195.1; 210/196; 210/202; 210/203; 210/416.3; 210/428

(58) Field of Classification Search ........... 210/172, 210/188, 192, 195.1, 196, 198.1, 202, 203, 210/416.3, 760, 97, 167, 241, 257.1, 258, 210/259, 428, 186.12
See application file for complete search history.

(56) References Cited

U.S. PATENT DOCUMENTS

| | | | |
|---|---|---|---|
| 3,692,180 A | 9/1972 | LaRaus | |
| 3,948,774 A | 4/1976 | Lindman | |
| 4,007,118 A | 2/1977 | Ciambrone | |
| 4,019,986 A | 4/1977 | Burris et al. | |
| 4,687,574 A | 8/1987 | Hellman | |
| 4,842,723 A * | 6/1989 | Parks et al. | 210/95 |
| 4,913,808 A | 4/1990 | Haque | |
| 4,975,185 A | 12/1990 | Taylor | |
| 5,427,693 A | 6/1995 | Mausgrover et al. | |
| 5,589,066 A | 12/1996 | Gray | |
| 5,709,799 A * | 1/1998 | Engelhard | 210/748 |
| 5,785,864 A | 7/1998 | Teran et al. | |
| 5,900,143 A | 5/1999 | Dalton et al. | |
| 5,972,216 A | 10/1999 | Acernese et al. | |
| 6,110,431 A * | 8/2000 | Dunder | 422/186.12 |
| 6,200,473 B1 | 3/2001 | Fahey | |
| 6,209,337 B1 | 4/2001 | Edwards | |
| 6,270,658 B1 * | 8/2001 | Pluss | 210/98 |
| 6,296,756 B1 | 10/2001 | Hough et al. | |
| 6,312,588 B1 | 11/2001 | Conrad et al. | |

* cited by examiner

Primary Examiner—Matthew O. Savage
(74) Attorney, Agent, or Firm—Ogilvy Renault, LLP

(57) ABSTRACT

There is disclosed a device adapted to provide water purified to human consumption level, and arranged for connection to a water supply. The device comprises a water purifier, a container for purified water and connections between the water purifier and the purified water container, The water purifier includes a filtering system that removes particles present in water to be purified as well as any undesirable adsorbable material, The filtering system is in fluid communication with the water supply on the one hand, and the container, on the other hand. The device also includes an ozone generator and a venturi for injecting ozone into filtered water downstream of the filtering system, but before introduction of the purified water into the container. A pump is arranged to draw water from the water supply, to feed same to the filtering system, and thereafter to the container. The container includes a bottle adapter imperviously mounted on the container and adapted for introducing purified water into the container as well as for recycling purified water to the water purifier, back to said container. An ozone destruction unit is provided to remove excess ozone that may escape from the purified water and controls are provided to operate the device.

20 Claims, 5 Drawing Sheets

PORTABLE WATER PURIFIER

CROSS-REFERENCE TO RELATED APPLICATIONS

This application claims priority under 35USC§119(e) of U.S. provisional patent application 60,460,950, filed on Apr. 8, 2003, Canadian patent application 2,439,983, filed on Sep. 5, 2003, Canadian patent application 2,463,397, filed on Apr. 7, 2004, the specifications of which are hereby incorporated by reference.

BACKGROUND OF INVENTION (a) Field of the Invention

The present invention relates to a portable water purifier. More specifically, the invention is concerned with a device that can provide water that is purified to human consumption level, and that uses ozone to purify water obtained from a source of water of unknown purification state.

(b) Description of the Prior Art

Treating water with ozone is well known, as well as by using a number of filtering systems that are designed to remove undesirable matter from water intended to be purified.

A plurality of more or less complicated systems, mostly adapted for the industrial treatment of water, have been described in the following U.S. patents:

U.S. Pat. No. 3,692,180
U.S. Pat. No. 4,007,118
U.S. Pat. No. 4,019,986
U.S. Pat. No. 4,687,574
U.S. Pat. No. 5,427,693
U.S. Pat. No. 5,785,864
U.S. Pat. No. 5,900,143
U.S. Pat. No. 6,200,473
U.S. Pat. No. 6,312,588

However, these systems are either very complicated or are not suitable for providing a portable package that is capable of providing water that is very suitable for drinking purpose and that is cheap to operate and manufacture.

It is therefore an object of the present invention to provide a portable device that can produce high quality water for human consumption.

SUMMARY OF INVENTION

The invention relates to a device adapted to provide water purified to human consumption level, and that is arranged for connection to a water supply. The device generally comprises a water purifier, a container for purified water and means for connecting the water purifier to the purified water container. The water purifier comprises filter means adapted to remove particles present in water to be purified as obtained from the water supply, and to adsorb undesirable adsorbable material therefrom, means allowing the filter means to be in fluid communication with the water supply on the one hand, and the container, on the other hand, an ozone generator and means for injecting ozone into filtered water downstream of the filter means, but before introduction of the purified water into the container, a pump arranged to draw water from the water supply, feed same to the filter means, and thereafter to the container, and wherein the container includes a neck portion, and a bottle adapter imperviously mounted on the neck portion and adapted for introducing purified water into the container as well as for recycling purified water to the water purifier, back to the container, the device also comprising an ozone destruction unit arranged to remove excess ozone that may escape from the purified water after introducing it into the container, and control means operative to cause the pump to draw water from the water supply and deliver purified water to the container and to inject ozone in the filtered water, and when the container has been filled with purified water, the control means operates to stop drawing from the water supply and start recycling purified water to the water purifier for further purification and redelivery into the container.

BRIEF DESCRIPTION OF DRAWINGS

The invention is described un further details in a preferred embodiment which is given as a mere illustration of the invention and without limitation, with reference to the annexed drawings, in which.

DESCRIPTION OF PREFERRED EMBODIMENT

Figure 1A:
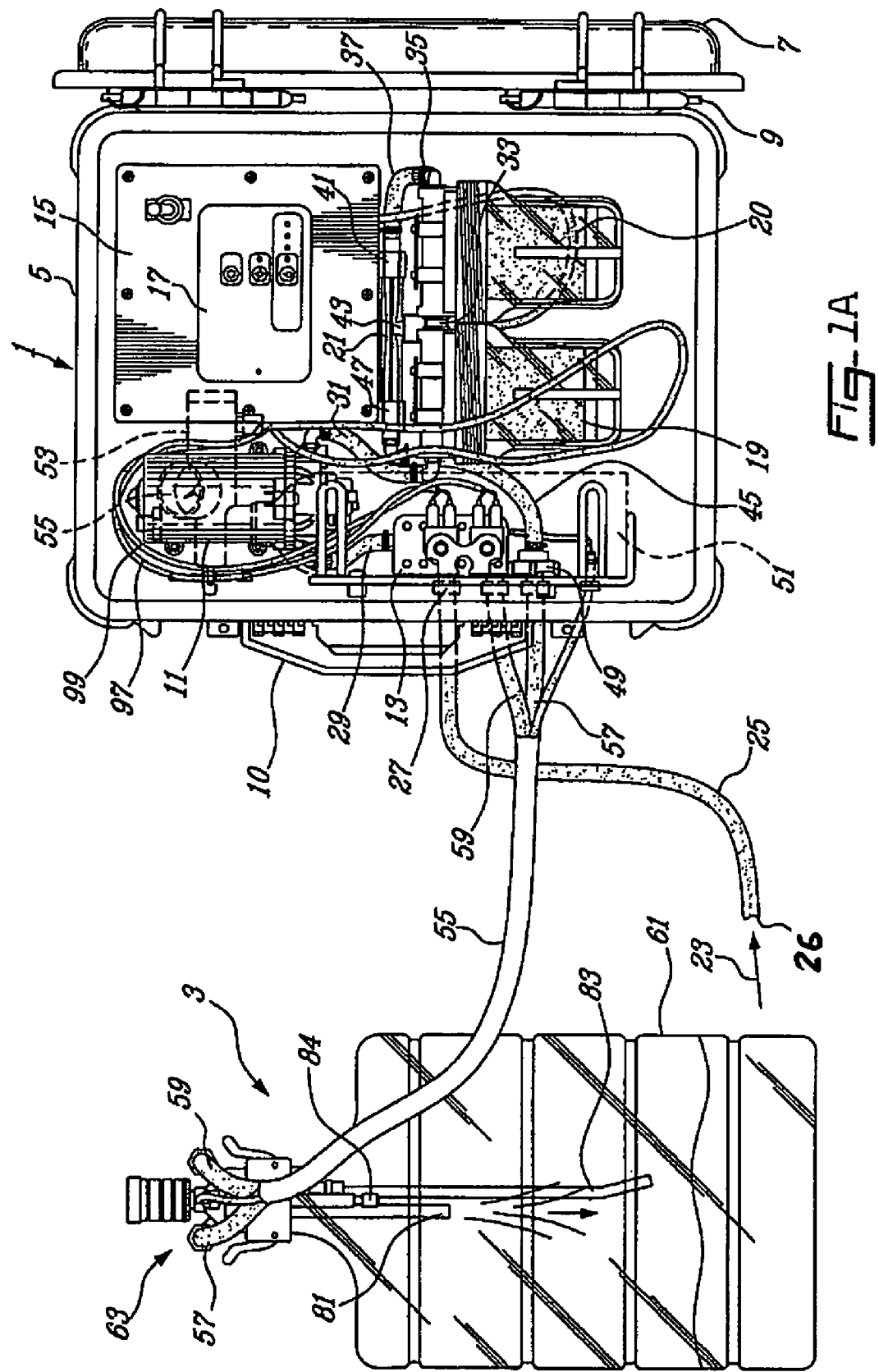
FIG. 1A is a view in elevation of a portable water purifier in which a water bottle is in the process of being filled with purified water.

As shown, the device according to the embodiment illustrated in the drawings generally comprises an ozone water purifier 1 and a water container 3 wherein water purified in water purifier 1 is delivered into water container 3 by means of a duct system that will be described more in detail later.

Water purifier 1 will now be described in detail. First, it should be noted that the whole assembly of the purifier is suitably contained in a case of standard construction that includes a case base 5 and a case cover 7, both being articulately connected as known by means of hinges 9. The case has a handle 10 that allows to carry it by hand, although any other known means to achieve this purpose cans be used. The essential parts of water purifier 1 include a pump 11 that allows a continuous circulation of water through water purifier 1, to water container 3, and back to water purifier 1, when desired. Water purifier 1 also includes a 3-way electronic valve 13 that controls the introduction of water into water purifier 1 via pump 11, and also towards and from water container 3 when recycling is considered important as will be seen later. There is also provided an ozone generator 15 with an associated control box 17 that manages the entire operation of the device, a filtering system made up of a sediment filter 19 and a activated charcoal filter 20, and a venturi ozone injector 21 that is designed to inject predetermined amounts of ozone into filtered water, that travels therethrough before sending purified water to water container 3.

More specifically, and with reference to FIG. 1A, it will be seen that water purifier 1 is connected to a water supply (not shown, but here designated by arrow 23) by means of water inlet tube 25 that connects at its outer end 26 to water supply 23 and at its inner end 27 to 3-way valve 13. On the other hand 3-way valve 13 is connected to pump 11 by means of valve duct 29 that is sealingly fixed at both ends thereof to 3-way valve and pump connectors (not shown). In turn, pump 11 is connected to sediment filter 19 by means of pump outlet duct 31, also sealingly fixed respectively to another pump connector (not shown) and a sediment filter connector (not shown).

Sediment filter 19 is connected to activated charcoal filter 20 by means of a pipe connection 33. At the outlet 35 of activated charcoal filter 20 there is provided a connector 35 and an outlet tube 37 is fixed at one end to that connector 35 and at the other end to ozone venturi injector 21 by means of connector 41. It will be realized that the filtered water that exits from both sediment filter 19 and activated charcoal filter 20 flows through outlet tube 37 and ozone venturi injector 21 in a direction towards water container 3 as will be seen more in detail later. It will also be noted that venturi ozone injector 21 is suitably disposed to receive ozone from ozone generator 15 via ozone duct 43, and is designed in known manner to inject predetermined amounts of ozone into the filtered water that travels along venturi injector 21.

A first portion 45 of an ozonated water duct is connected at one end to water pipe connector 47 and at the other to case connector 49. The above describes the elements ensuring a water path through water purifier 1, as will readily be understood by one skilled in the art.

To complete the description of water purifier 1, it should be mentioned that the latter comprises an oxygen bottle 51 shown in dotted lines and connected to oxygen regulator 53 and pressure gauge 55 also shown in dotted lines, to supply ozone generator 15 with the required oxygen to provide desired amounts of ozone to the filtered water in venturi injector 21.

Figure 1B:
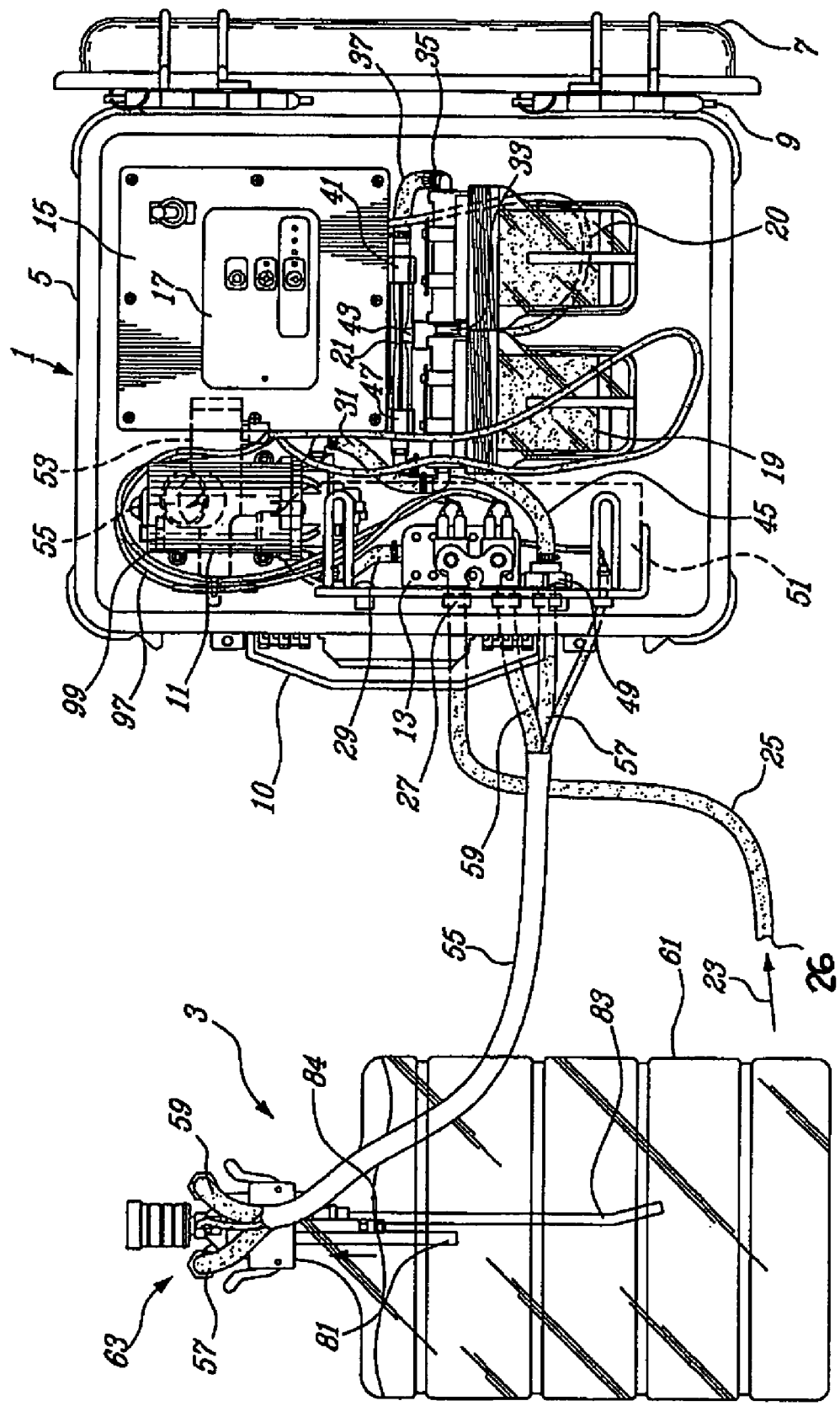
FIG. 1B is a view similar to FIG. 1A with the water bottle full of water.
Figure 1C:
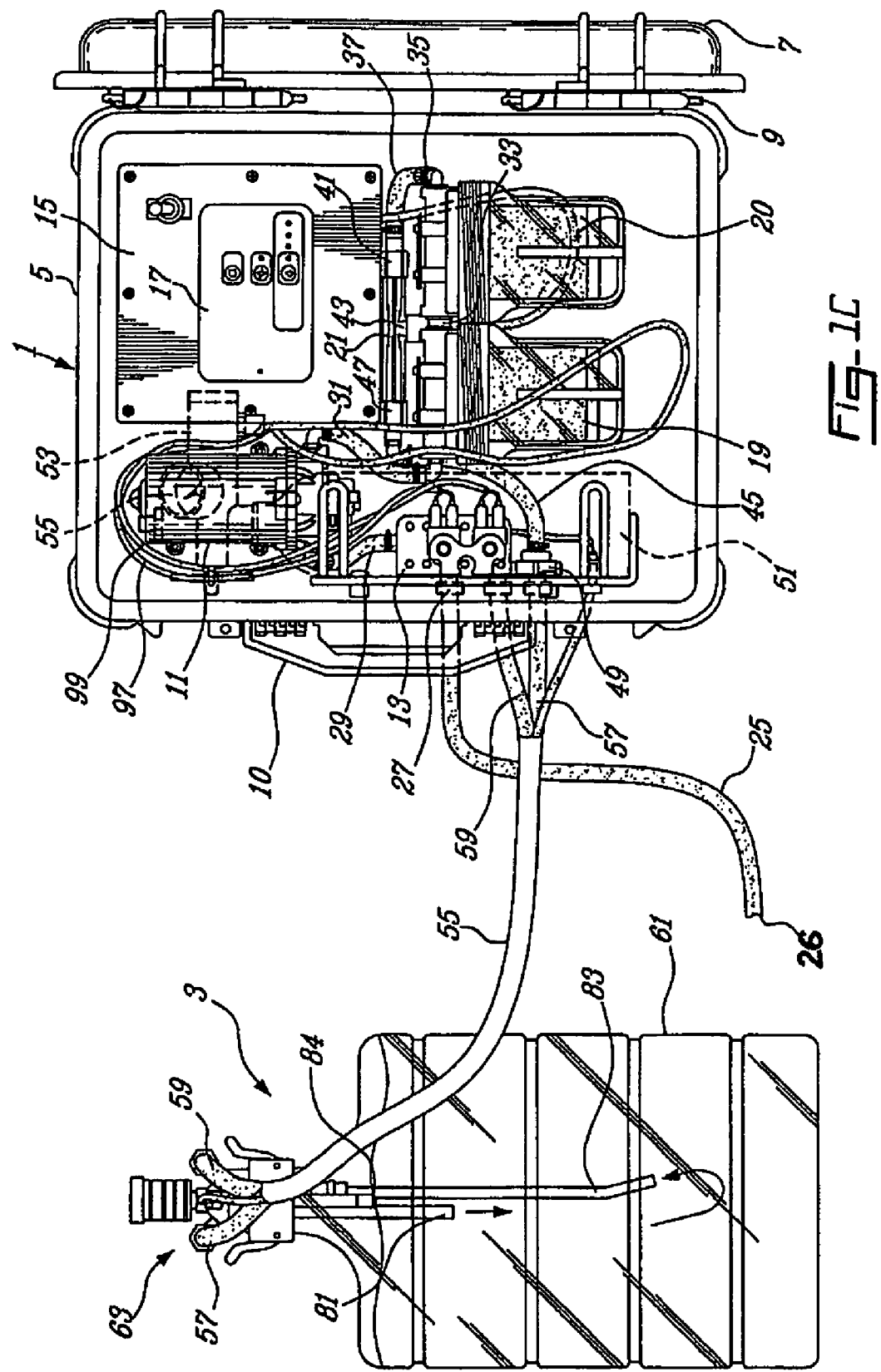
FIG. 1C is a view similar to FIG. 1A wherein purified water in the filled water container is being recycled for further purification.

Referring again to the drawings, more particularly FIGS. 1A, 1B and 1C, it will be seen that water purifier 1 and water container 3 are connected together by means of a twin tube 55. The latter encloses the second portion 57 of the ozonated water duct, and a recycling duct 59, the purpose thereof will be discussed later. As shown, second portion 57 of the ozonated water duct is joined to first portion 45 by means of case connector 49. On the other hand, recycling duct 59 is connected at its inner end to 3-way valve 13 as shown. The connections at the outer ends of both the second portion 57 of the ozonated water duct and the recycling duct 59 will be described later.

Figure 2:
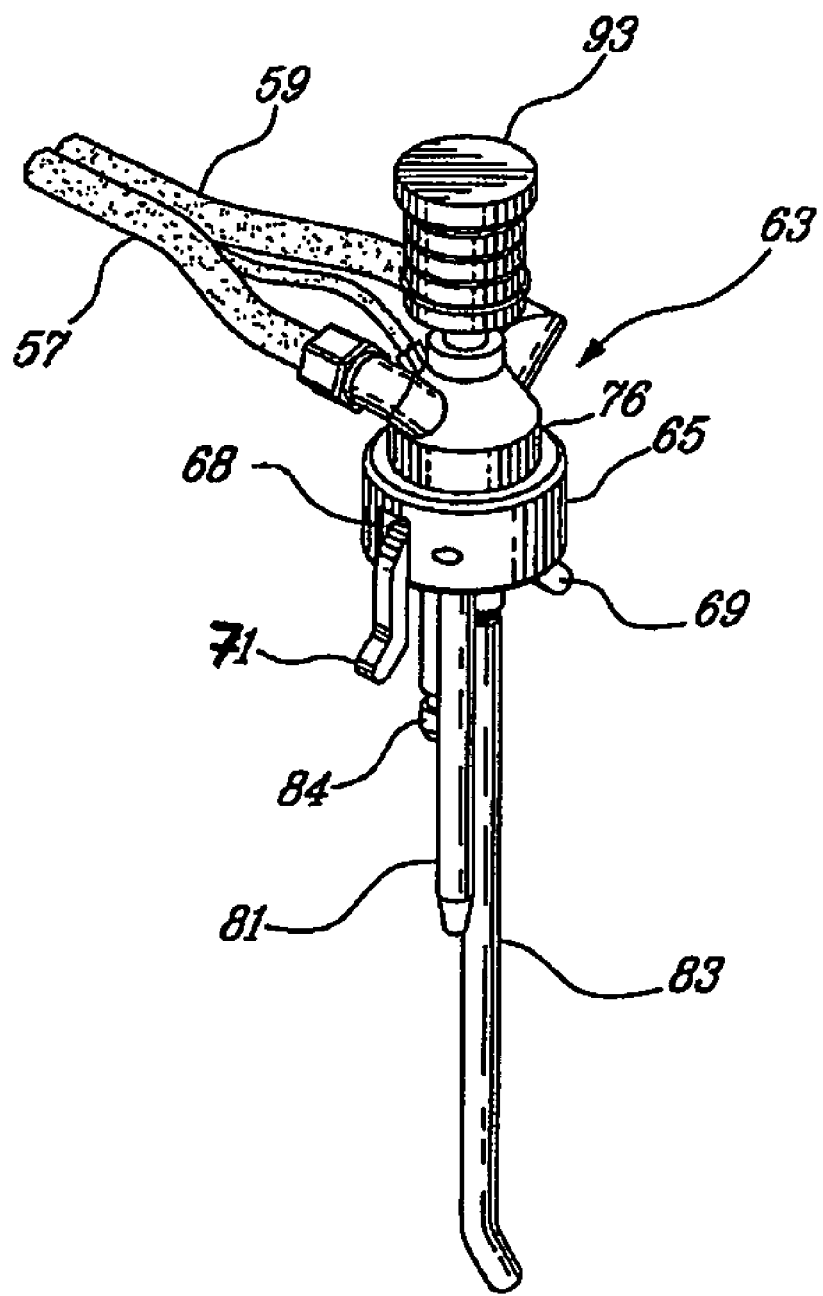
FIG. 2 is a perspective view of a bottle adapter for mounting on the water bottle and delivering purified water thereto, the adaper being shown ready for mounting on the bottle.
Figure 3:
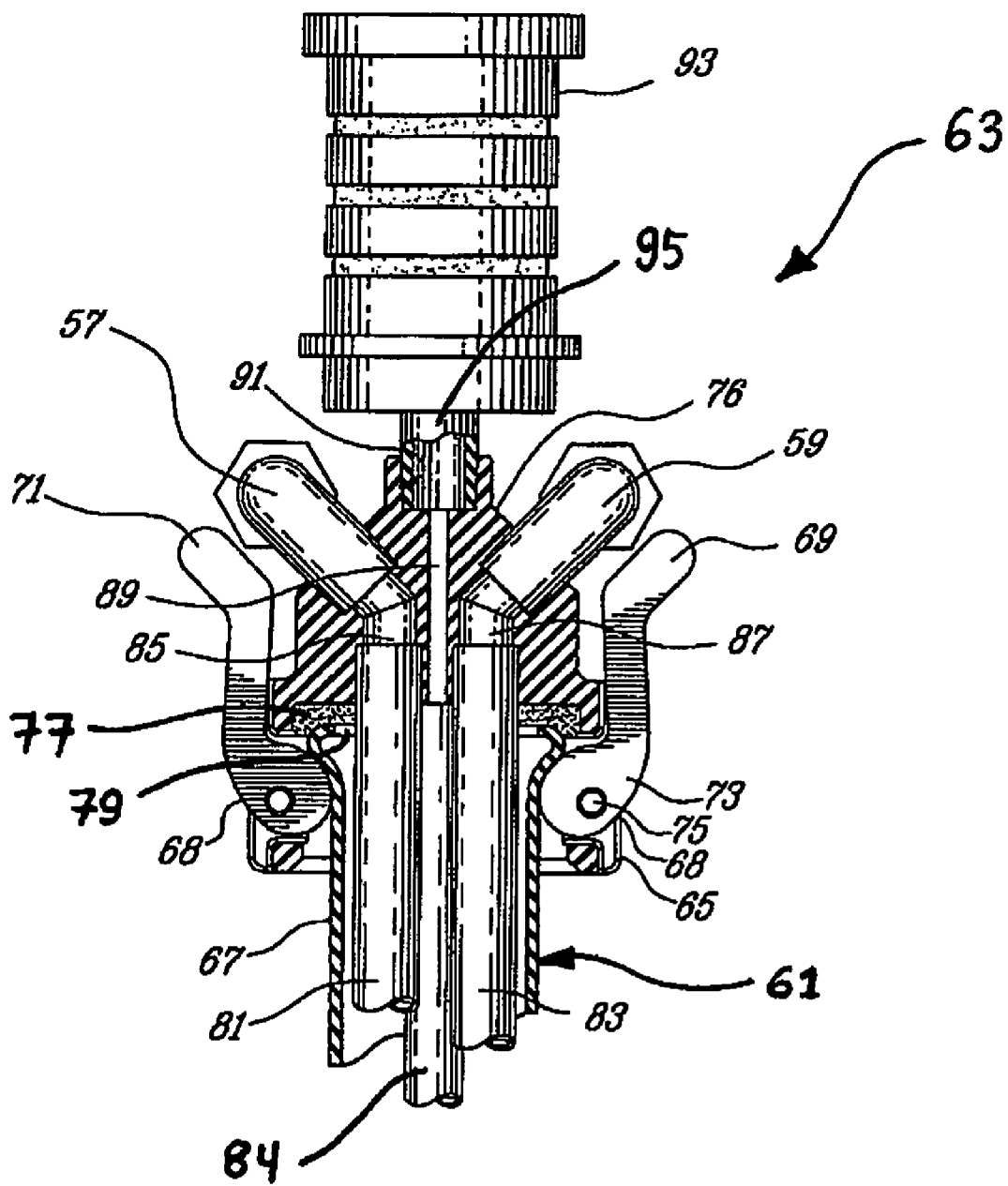
FIG. 3 is a partial cross-section view in elevation through the bottle adapter illustrated in FIG. 2, except that it is shown as mounted and fixed on the bottle.

Turning now to water container 3 and with particular reference also to FIGS. 2 and 3, it will be seen that it is generally comprised of a bottle 61 and a bottle adapter 63. Bottle 61 can be selected among any suitable water containers, however in the illustrated embodiment, it has been shown as a standard eighteen liter bottle used on the market to contain drinking water. Of course any other suitable water container can be used without departing from the scope and spirit of the invention.

On the other hand, adapter 63 here consists of a ring member 65 of special construction, that is shaped to fit over the neck 67 of bottle 61 and is adapted to be snapped against neck 67 when the device is in operation. However, bearing in mind that adapter 63 must easily be placed over neck 67 and that when it is mounted thereon, it must be imperviously engaged, ring member 65 is of specific design. For this purpose, ring member 65 is formed with lateral openings 68 through which a pair of pivoting clamp tightening arms 69, 71 are inserted, as shown. Each clamp tightening arm 69, 71 is formed with a rotatable cam riding end 73 and is mounted on ring member 65 through openings 68 to pivot about pivot point 75.

Ring member 65 is additionally engaged with a distribution unit 76, with a seal member 77 separating them and closing opening 79 of neck 67 when the adapter 63 is mounted on bottle 61. So, when one wishes to mount the combination of ring member 65 and distribution unit 76 over neck 67, clamp tightening arms 69,71 are first outwardly pivoted and this will slightly loosen up ring member 65 and allow easy sliding of ring member 65 over neck 67. An inward pivoting of clamp tightening arms 69, 71 will thereafter tightly and imperviously engage ring member 65 over neck 67 as will be understood by one skilled in the art.

As illustrated particularly in FIGS. 2 and 3, distribution unit 76 comprises an injection tube 81 and a suction tube 83 which both extend vertically therethrough to penetrate into bottle 61 as shown, as well as a water level sensor 84 (FIGS. 1A, 1B and 1C). Injection tube 81, on the one hand, prolongs just a short distance inside bottle 61, as particularly shown in FIGS. 1A, 1B and 1C, while suction tube 83 desirably reaches deep into the interior of the bottle, for example as shown in FIG. 1C. Elbow connectors 85 and 87 are also disposed as shown in distribution unit 76 to respectively connect ozonated water duct 57 and recycling duct 59 to bottle adapter 63. Distribution unit 76 is bored at 89 as shown in FIG. 3, and a recess 91 is formed at the top of distribution unit 75, which is aligned with bore 89. An ozone destruction unit 93 of standard construction but which has a restricted lower end 95 is mounted at its lower restricted end 95 into recess 91, and is in connection with bore 89 to receive and destroy any released ozone from the purified water in bottle 61.

Turning back to FIGS. 1A, 1B and 1C, it will be seen that 3-way valve 13 is operatively connected to control box 17 by means of 3-way valve leads 97 and 99, in order to direct the device to proceed in a filling operation of bottle 61, or in a recycling operation for providing a water that is further purified.

In operation, the portable device is brought to a water supply and is connected thereto by means of water inlet tube 27. The control box 17 is then programmed to direct the ozone generator 15 to feed predetermined amounts of ozone to the venturi injector 21, and the pump 11 to initiate the procedure. If it is intended to proceed to a single purification without recycling, the 3-way valve 13 is in position wherein a water purification step only, will take place. In this case, when the purified water in bottle 61 is at the level indicated in FIG. 1B, sensor 84 will act to stop operation of the purification system. Any ozone released in bottle 61 will ascend through bore 89 (FIG. 3) to be destroyed in known manner in ozone destruction unit 93.

If on the other hand it is preferred to recycle purified water that is present in bottle 61 for further purification, control box 17 is programmed to provide such operation. In this case, when bottle 61 has been filled as in the previous operation, sensor 84 will direct 3-way valve 13 to stop withdrawing water from the water supply 23 and to suck filtered water from bottle 61 via recycling duct 59 for further filtering and ozone treatment, followed by feeding the further purified water back into bottle 61. The number of cycles can of course be programmed according to the wishes of the operator of the device.

It is understood that the invention is not restricted to the above embodiments and that it intends to cover any modification thereto, the scope thereof being defined in the appended claims.

We claim:

1. A hand-carried water purifier for use with a water bottle, the purifier comprising:
    a three-way valve having a water supply inlet, a water recycling inlet and an outlet, the valve being selectively actuatable between a first position where the outlet is in fluid communication with the water supply inlet and a second position where the outlet is in fluid communication with the water recycling inlet;
    a pump having an inlet and an outlet, the inlet of the pump being in fluid communication with the outlet of the valve;
    a filter having an inlet and an outlet, the filter being in fluid communication with the outlet of the pump;
    an ozone generator to generate ozone from oxygen provided by an oxygen bottle;
    an ozone injector having an inlet and an outlet, the inlet of the injector being in fluid communication with the outlet of the filter, the injector mixing ozone from the ozone generator with water when flowing between the inlet and the outlet of the injector;
    a case enclosing the valve, the pump, the filter, the ozone generator and the ozone injector;
    a bottle neck adapter to be removably secured by hand to the bottle, the bottle neck adapter having a water inlet, a water outlet and a gas outlet, the water inlet of the bottle neck adapter being in fluid communication with the outlet of the ozone injector, the water outlet of the bottle neck adapter being in fluid communication with the water recycling inlet; and
    a water level sensor connected to the bottle neck adapter to generate a signal to which the valve is responsive for selecting between the first and the second position of the valve.

2. The hand-carried water purifier of claim 1 wherein the bottle neck adapter further comprises an ozone destruction unit communicating with the gas outlet, for destroying ozone escaping the bottle from the gas outlet.

3. The hand-carried water purifier of claim 1 wherein the bottle neck adapter further comprises an injection tube which extends a first distance into the bottle and is connected to the water inlet, and a suction tube which extends a second distance into the bottle and is connected to the water outlet, the second distance being substantially greater than the first distance.

4. The hand-carried water purifier of claim 1 wherein the bottle neck adapter comprises a ring member shaped to be mounted over a neck of the bottle, and at least one tightening cam mounted on the ring member, the tightening cam being operable by hand between an opened position where the ring member is easily engageable onto and disengageable from the neck portion, and a closed position where the ring member is secured to the neck portion.

5. The hand-carried water purifier of claim 1 wherein the filter includes a sediment filter and an activated charcoal filter in serial flow connection.

6. The hand-carried water purifier of claim 1 further comprising a control box to actuate the 3-way valve in response to the signal from the water level sensor.

7. The hand-carried water purifier of claim 6 wherein the control box is programmed to automatically actuate the valve to the second position upon receiving the signal from the water level sensor to engage water recycling.

8. The hand-carried water purifier of claim 7 wherein the control box is programmed to stop the pump after a predetermined number of cycles of water recycling have been reached.

9. The hand-carried water purifier of claim 6 wherein the case further encloses the control box and the oxygen bottle.

10. The hand-carried water purifier of claim 1 wherein the ozone injector is a venturi ozone injector.

11. A hand-carried water purifier for use with a water bottle, the purifier comprising:
    a duct system having a water inlet connectable to a water supply, a water outlet, a pump between the water inlet and the water outlet, a filter downstream from the pump, and an ozone injector downstream from the filter;
    a bottle neck adapter to be removably secured by hand to the bottle for connecting the water outlet to the bottle;
    an ozone generator having an oxygen inlet connectable to an oxygen bottle for generating ozone from the oxygen and providing the ozone to the ozone injector; and
    a hand-carried case enclosing the pump, the filter, the ozone generator and the ozone injector.

12. The hand-carried water purifier of claim 11 wherein the bottle neck adapter further comprises a suction tube for recycling water from the water bottle, the duct system further comprising a three-way valve actuatable to selectively connect one among the water inlet and the suction tube to the pump.

13. The hand-carried water purifier of claim 12 wherein the bottle neck adapter further comprises an injection tube, the suction tube being longer than the injection tube.

14. The hand-carried water purifier of claim 12 further comprising a water level sensor mounted on the bottle neck adapter to generate a signal to which the valve is responsive for selectively connecting one among the water inlet and the suction tube to the pump.

15. The hand-carried water purifier of claim 11 wherein the bottle neck adapter comprises a ring member shaped to be positioned over a neck of the bottle, and at least one tightening cam mounted on the ring member, the tightening cam being operable by hand between an opened position where the ring member is engageable onto and disengageable from the neck portion, and a closed position where the ring member is secured to the neck portion.

16. A hand-carried water purifier for use with a water container, the purifier comprising:
    a duct system having a water inlet connectable to a water supply, a water outlet and a suction tube both being connectable to the water container, a pump between the water inlet and the water outlet, a three-way valve actuatable to selectively connect one among the water inlet and the suction tube to the pump, a filter downstream from the pump, and an ozone injector downstream from the filter;
    an ozone generator having an oxygen inlet connectable to an oxygen bottle for generating ozone from the oxygen and providing the ozone to the ozone injector; and
    a hand-canied case enclosing the three-way valve, the pump, the filter, the ozone generator and the ozone injector.

17. The hand-carried water purifier of claim 16 wherein the water container is a bottle, further comprising a bottle neck adapter to be removably secured by hand to the bottle, the bottle neck adapter having the water outlet and the suction tube.

18. The hand-carried water purifier of claim 16 further comprising a water level sensor for the water container to generate a signal to which the valve is responsive for selectively connecting one among the water inlet and the suction tube to the pump.

19. The hand-carried water purifier of claim 18 further comprising a control box to receive the signal from the water level sensor and to actuate the 3-way valve, the control box being programmed to automatically actuate the valve to connect the suction tube to the pump upon receiving the signal from the water level sensor to engage recycling.

20. The hand-carried water purifier of claim 19 wherein the control box is programmed to stop the pump after a predetermined number of cycles of recycling have been reached.

* * * * *